(12) United States Patent
Christison et al.

(10) Patent No.: US 7,761,627 B2
(45) Date of Patent: Jul. 20, 2010

(54) WIRELESS USB HUB

(75) Inventors: Gregory L. Christison, Fairview, TX (US); Brian R. Doherty, Allen, TX (US); Tom Miller, Plano, TX (US); Anoop Nair, Allen, TX (US); Sidney B. Schrum, Jr., Fairview, TX (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 11/963,499

(22) Filed: Dec. 21, 2007

(65) Prior Publication Data
US 2008/0162741 A1 Jul. 3, 2008

Related U.S. Application Data (60) Provisional application No. 60/871,527, filed on Dec. 22, 2006.

(51) Int. Cl.
*G06F 13/12* (2006.01)
(52) U.S. Cl. .......................................... 710/62; 710/74
(58) Field of Classification Search ........................ None
See application file for complete search history.

(56) References Cited

U.S. PATENT DOCUMENTS 6,725,302 B1 * 4/2004 Benayoun et al. ............. 710/62
6,944,687 B2    9/2005 Doragh et al.

(Continued)

OTHER PUBLICATIONS

Compaq Computer Corporation et al., "Universal Serial Bus Specification", Revision 2.0, dated Apr. 27, 2000.

(Continued)

*Primary Examiner*—Eron J Sorrell
(74) *Attorney, Agent, or Firm*—Dang M. Vo (57) ABSTRACT

This invention provides a Wireless USB hub that includes a first port configured to communicate with a wired USB enabled device, a second port configured to communicate with a first wireless USB enabled device, and a controller that detects the wired USB enabled device and presents the wired USB enabled device as a native wireless USB enabled device to the first wireless USB enabled device.

21 Claims, 12 Drawing Sheets

U.S. PATENT DOCUMENTS

| | | | |
|---|---|---|---|
| 7,334,059 B2 | 2/2008 | Moyer | |
| 7,502,011 B2 | 3/2009 | Braun et al. | |
| 7,526,590 B2 | 4/2009 | Ismil et al. | |
| 7,574,323 B2 | 8/2009 | Rappaport et al. | |
| 2005/0278472 A1 | 12/2005 | Gierke | |
| 2006/0048196 A1 | 3/2006 | Yau | |
| 2006/0061963 A1 | 3/2006 | Schrum | |
| 2006/0073788 A1 | 4/2006 | Halkka et al. | |
| 2006/0143330 A1 | 6/2006 | Kiehl | |
| 2006/0166621 A1 | 7/2006 | Bae et al. | |
| 2006/0179144 A1* | 8/2006 | Nagase | 709/226 |
| 2006/0215574 A1 | 9/2006 | Padmanabhan et al. | |
| 2006/0218315 A1 | 9/2006 | Okajima et al. | |
| 2007/0066314 A1 | 3/2007 | Sherman et al. | |
| 2007/0204076 A1 | 8/2007 | Arulambalam et al. | |
| 2007/0230500 A1 | 10/2007 | Spenik et al. | |
| 2007/0286416 A1* | 12/2007 | Bertoni et al. | 380/37 |
| 2008/0005395 A1* | 1/2008 | Ong et al. | 710/36 |
| 2008/0025329 A1 | 1/2008 | Livet et al. | |
| 2009/0006676 A1 | 1/2009 | Sampat et al. | |
| 2009/0172216 A1 | 7/2009 | Luedeke et al. | |

OTHER PUBLICATIONS

Agere Systems, Inc. et al., "Wireless Universal Serial Bus Specification", Revision 1.0, dated May 12, 2005.

Gregory L. Christison et al., U.S. Appl. No. 11/963,427, filed Dec. 21, 2007, for "Enhanced Wireless USB Protocol".

International Search Report—PCT/US07/088664, International Search Authority—US, Nov. 18, 2008.

Wiquest "Wiquest Transforms Wireless Digital Video with New WQST100/101 Chipset & Breakthrough WiDV(TM) Technology," Online, Dec. 2006, pp. 1-5.

* cited by examiner (Prior Art)

WIRELESS USB HUB

PRIORITY DATA

This application claims priority to U.S. provisional patent application Ser. No. 60/871,527, titled, "ENHANCED WIRELESS USB PROTOCOL AND HUB", filed Dec. 21, 2006, the disclosure of which is incorporated herein by reference.

RELATED PATENT APPLICATION

This application is related to the following: U.S. patent application Ser. No. 11/963,427, titled, "Enhanced Wireless USB Protocol" filed Dec. 21, 2007; assigned to a common assignee.

TECHNICAL FIELD

The present invention relates generally to Certified Wireless Universal Serial Bus (WUSB) interfaces. More specifically, the present invention is related to improving the throughput of Certified Wireless USB Wire Adapter systems.

BACKGROUND

Universal Serial Bus (USB) is a serial bus standard for attaching electronic peripheral devices to a host computing device. It was designed for personal computers, but its popularity has prompted it to also become commonplace on video game consoles, PDAs, portable DVD players, mobile phones, and other popular electronic devices. The goal of USB is to replace older serial and parallel ports on computers, since these were not standardized and called for a multitude of device drivers to be developed and maintained.

USB was designed to allow peripherals to be connected without the need to plug expansion cards into the computer's expansion bus and to improve plug-and-play capabilities by allowing devices to be hot-swapped, wherein devices are connected or disconnected without powering down or rebooting the computer. When a device is first connected, the host enumerates and recognizes it, and loads the device driver needed for that device.

USB can connect peripherals such as mouse devices, keyboards, scanners, digital cameras, printers, external storage devices, etc., and has become the standard connection method for many of these devices.

The Wireless Universal Serial Bus Specification, revision 1.0 (published May 12, 2005; available from the USB Implementers Forum, Inc.) describes and specifies extensions to wired USB which enable the use of wireless links in extended USB/WUSB systems. These wireless extensions to the USB specification are referred to as Certified Wireless Universal Serial Bus or simply Wireless USB (WUSB). The extensions build on existing wired USB specifications and WiMedia Alliance MAC and PHY ultra-wide-band (UWB) wireless technology.

The WUSB Specification includes descriptions and specifications of devices known as Wire Adapters (WA). These devices are wired-USB-to-Wireless-USB adapters which allow "legacy" wired USB hosts and devices to be interconnected with WUSB devices in extended USB systems containing both wired and wireless links.

There are two types of Wire Adapters: Host Wire Adapter (HWA) and Device Wire Adapter (DWA) which work in conjunction with each other. HWAs have a wired "upstream" USB port and a wireless "downstream" WUSB port, allowing a wired USB host to communicate with WUSB devices.

DWAs have a wireless "upstream" WUSB port and one or more wired "downstream" USB ports, allowing wired USB devices to communicate with a Wireless USB host.

The WUSB Specification Wire Adapter Protocol is used to transfer data through WAs and to control and manage WAs. Unfortunately, the Wire Adapter Protocol as specified in the WUSB Specification in typical situations is very inefficient, resulting in unacceptably low throughput. The inefficiency of the protocol is primarily attributable to two factors: the protocol is "chatty" in that a number of non-data messages conveying control and transfer complete status information are exchanged for each block of data transferred. In addition, the protocol does not lend itself well to "pipelining" of data flow through the system, resulting in high latency during transfer of data and therefore low throughput.

Therefore, it would be desirable to have a method for improving throughput for devices in USB systems containing both wired and wireless USB devices.

BRIEF DESCRIPTION OF THE DRAWINGS

Aspects of the present disclosure are best understood from the following detailed description when read with the accompanying figures, in which.

DETAILED DESCRIPTION

An embodiment of the present invention provides a Wireless USB (WUSB) hub that allows wireless communication between wired USB devices and a host system. The WUSB hub acts as a proxy for the wired USB devices and presents them to the host system as if they were native WUSB devices. The WUSB hub presents an attached wired USB device as a unique WUSB device with its own device address or as a separate function on an already existing device (the WUSB hub for instance, which may enumerate as a Device Wire Adapter).

Another embodiment of the present invention provides an enhanced Wire Adapter Protocol for improving data throughput for a wireless USB system that includes wire adapters that wirelessly transmit data between a host system and a wired USB device. Using this protocol, wire adapters automatically segment incoming data transfers into smaller segments, wherein a wire adapter uses its buffer status to determine how much data to fetch. Data is transferred downstream without waiting to receive a complete data segment when a wire adapter receives a specified minimum amount of data from upstream. The enhanced protocol also dispenses with Transfer Complete messages and instead determines when a data transfer has completed by polling downstream for a transfer result. The wire adapters also employ forward pipe descriptors in conjunction with remote pipe descriptors to forward transfer requests downstream.

Embodiments of the present invention include improving the throughput of WUSB Wire Adapter systems. One embodiment includes streamlining the Wire Adapter Protocol to improve the throughout of WUSB Wire Adapter systems. Another embodiment, includes presenting wired USB devices plugged into a WUSB hub as if they are "native" WUSB devices. This embodiment is referred to as a USB Device Proxy WUSB Hub, or simply WUSB hub.

Figure 1:
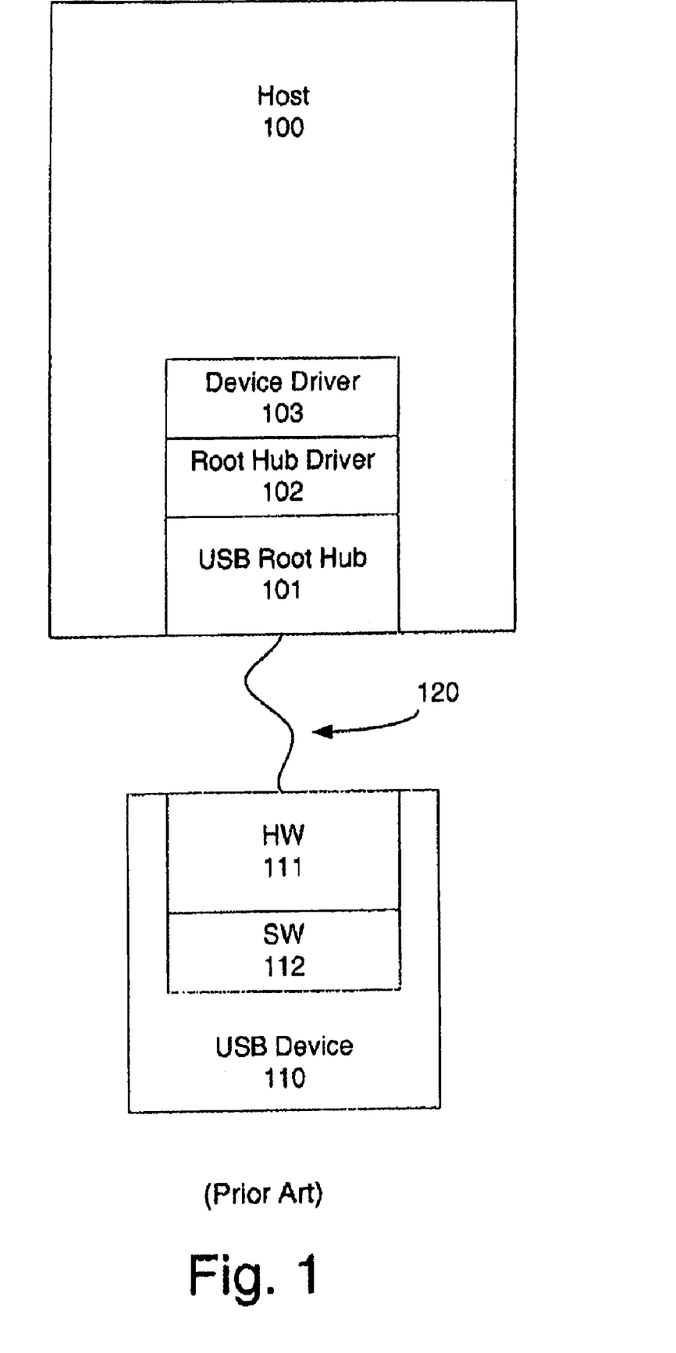
FIG. 1 shows the standard configuration of a wired USB system in accordance with the prior art.

FIG. 1 shows the standard configuration of a wired USB system in accordance with the prior art. In this configuration, the host system 100 includes the USB root hub hardware 101, USB root hub driver 102, and a device driver 103. The external USB device 110 includes adapter hardware of its own 111 and software 112 related to its functions. The host 100 and external device 110 are connected by a wired USB connection 120 which plugs into the respective USB adapters 101, 111.

Figure 2:
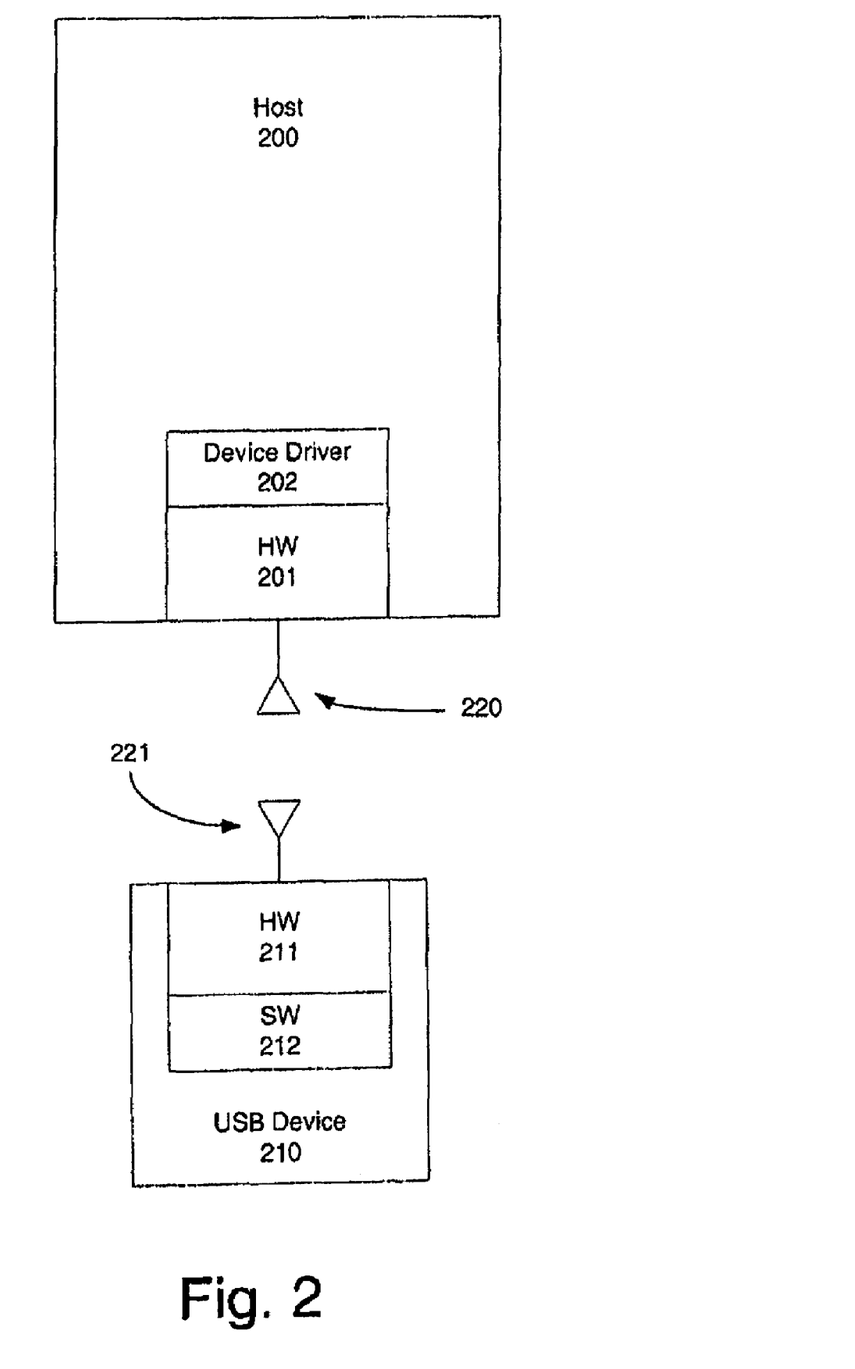
FIG. 2 shows a configuration for a Wireless USB system with a "native" WUSB device directly attached to a WUSB host.

FIG. 2 shows a configuration for a Wireless USB system with a "native" WUSB device directly attached to WUSB host. The system depicted in FIG. 2 is similar in layout to that depicted in FIG. 1, with the major difference being that both the host 200 and the external USB device 210 have built-in wireless adapters 201, 211, respectively. These adapters 201, 211 communicate over a wireless signal provided by antennae 220, 221 instead of via a wired cable. The native Wireless USB system in FIG. 2 represents the goal which much of the computer/electronics industry is attempting to reach. Currently, however, very few devices have native wireless capability. Therefore, it is desirable for the industry to accommodate systems containing both wired and wireless USB devices and hosts.

Figure 3:
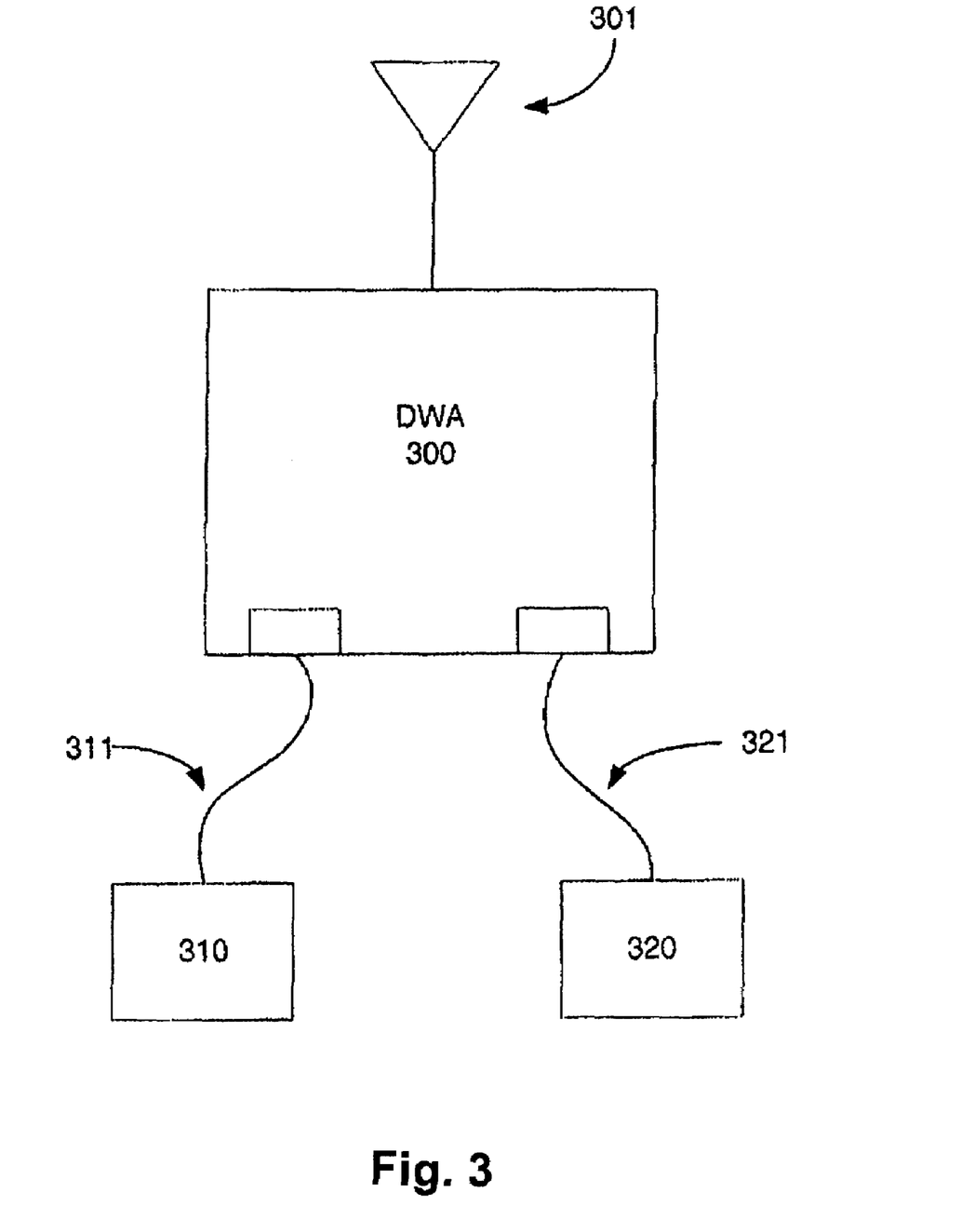
FIG. 3 shows a Device Wire Adapter connected to two wired USB devices.

The current solution for connecting wired USB devices into WUSB systems is to plug them into a Device Wire Adapter (DWA), depicted in FIG. 3. Wired USB devices 310, 320 are plugged into the DWA 300 using standard USB cables 311, 321. The DWA 300 in turn provided a wireless antenna 301 that provides a wireless link to a USB host.

A corresponding Host Wire Adapter (HWA) may be used by the host system to communicate with the DWA, or the DWA may communicate with the host system through a "native" WUSB host adapter.

Figure 4:
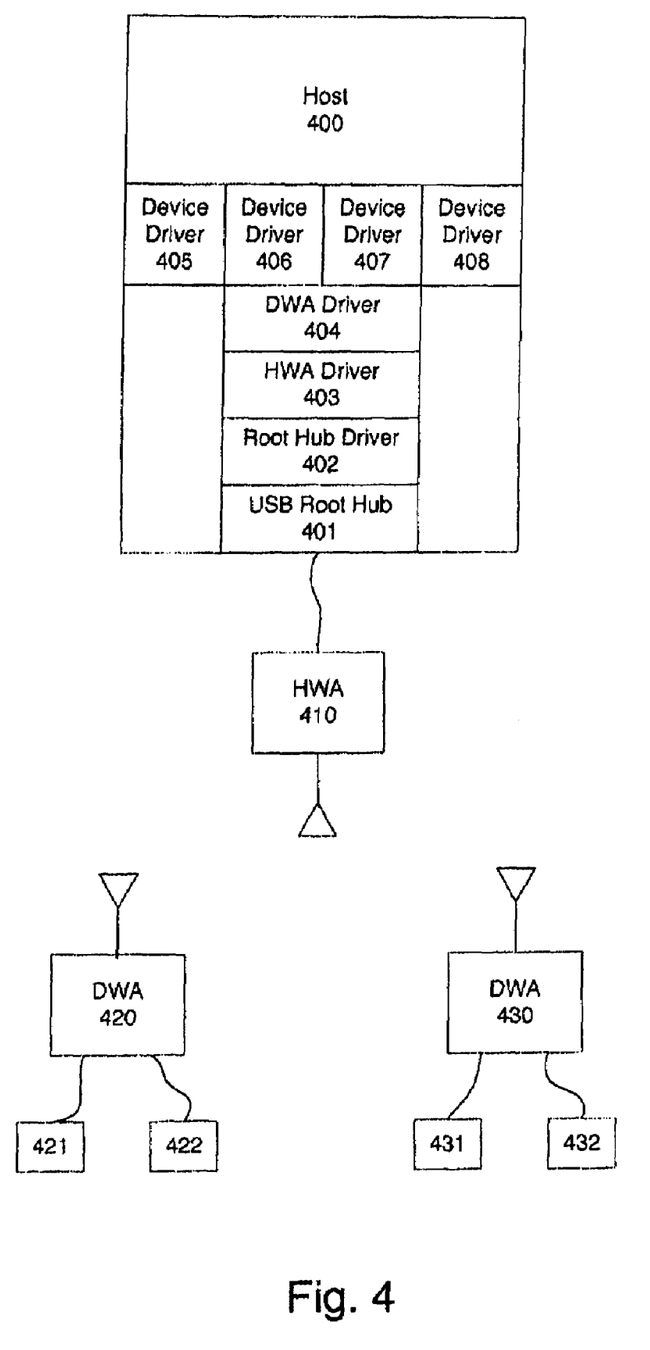
FIG. 4 shows a system incorporating Device Wire Adapters and a Host Wire Adapter to provide wireless USB functionality to legacy wired USB devices in accordance with the prior art.

FIG. 4 shows a system incorporating Device Wire Adapters and a Host Wire Adapter to provide wireless USB functionality to legacy wired USB devices. This example shows the Host Wire Adapter (HWA) 410 connected to the host 400 as an external device, which is typical of current designs. Eventually, the HWA 410 will be replaced by a native WUSB host adapter embedded inside the host 400 system.

Because the HWA 410 and DWAs 410, 420 are recognized as USB devices, the host system 400 incorporates multiple software driver layers to enable communication with wired external USB devices 421, 422, 431, 432 via the HWA 410 and DWAs 420, 430.

The host 400 has a wired USB root hub 401 to which the HWA 410 is connected (whether external or internal to the host housing). Next is the root hub driver 402. The host has a separate HWA driver 403 as well as a DWA driver 404. On top of these are device drivers 405-408 that are specific to the external USB devices 421, 422, 431, 432 at the end of the chain. Each of the device drivers 405-408 attaches to and communicates with the DWA driver 404.

Data is communicated from the host 400 to the HWA 410 through a wired connection. The HWA 410 then uses a wireless protocol to transmit the data to one of the DWAs 420, 430, which in turn sends the data to the specified USB device 421, 422, 431, or 432 over a wired connection.

Figure 5:
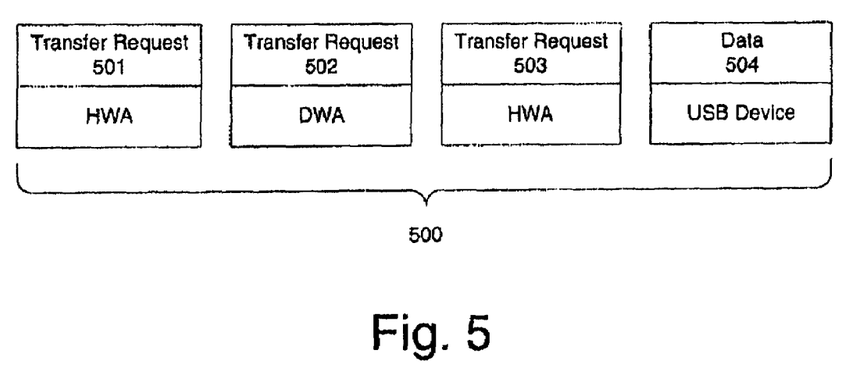
FIG. 5 shows the sequence of data packets used to communicate over the wireless USB system depicted in FIG. 4.

FIG. 5 shows the sequence of packets used to communicate over the wireless USB system depicted in FIG. 4. Due to the presence of the HWA and DWA in the system, the packet sequence 500 includes control packets inserted ahead of the data to tell the DWA which port to route the data through and get an acknowledgement. This occurs for each HWA and DWA in the system between the external device and the host.

In the example shown in FIG. 5, the data packet 504 is preceded by Transfer Request 503, while Transfer Request 502 is preceded by Transfer Request 501. Transfer Requests 501 and 503 direct the HWA to send Transfer Request 502 and data packet 504 to the DWA. Transfer Request 502 directs the DWA to send data packet 504 to the USB device. A transfer request only appears as such to its intended device. For example, the DWA transfer request 502 looks like data to the HWA but looks like a transfer request to the DWA.

As explained above, the current wireless USB systems use control packets (Transfer Requests) which are generated by multiple layers of drivers between the external device and its specific driver in the host in order to direct the flow of data to or from the target USB device. Unfortunately, this design dramatically hampers throughput.

Figure 6A:
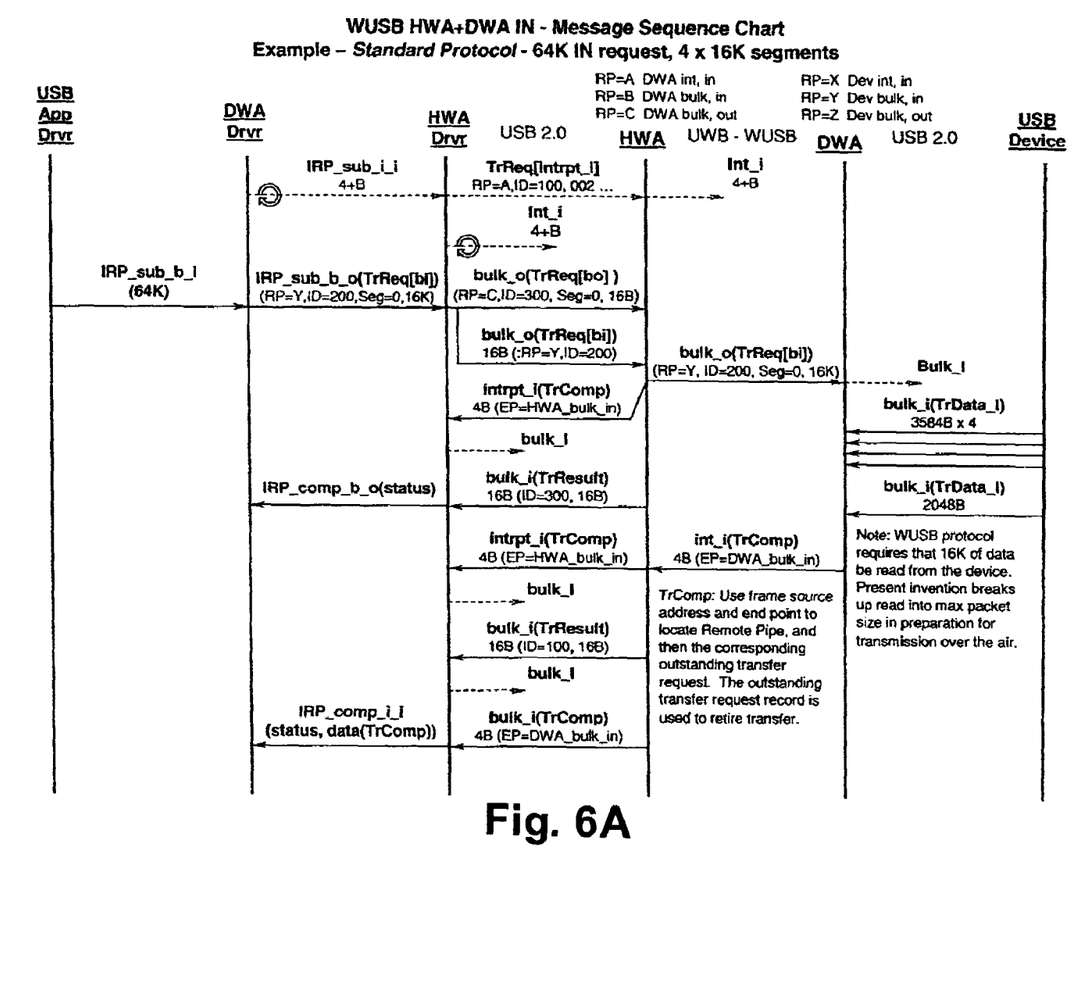
FIGS. 6A and 6B are sequence diagrams illustrating the process flow for an IN request using the standard wire adapter protocol in accordance with the prior art.
Figure 6B:
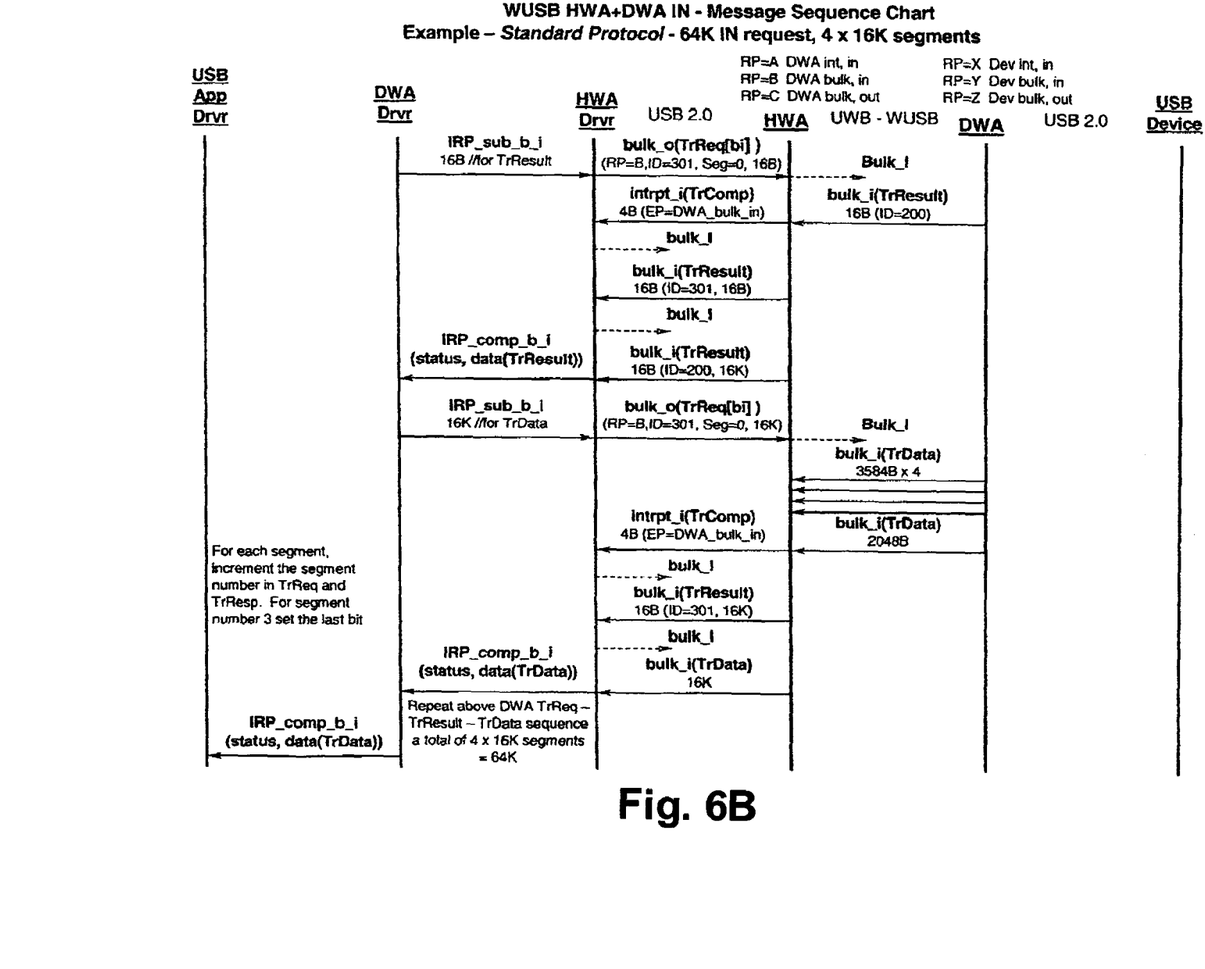
Figure 7A:
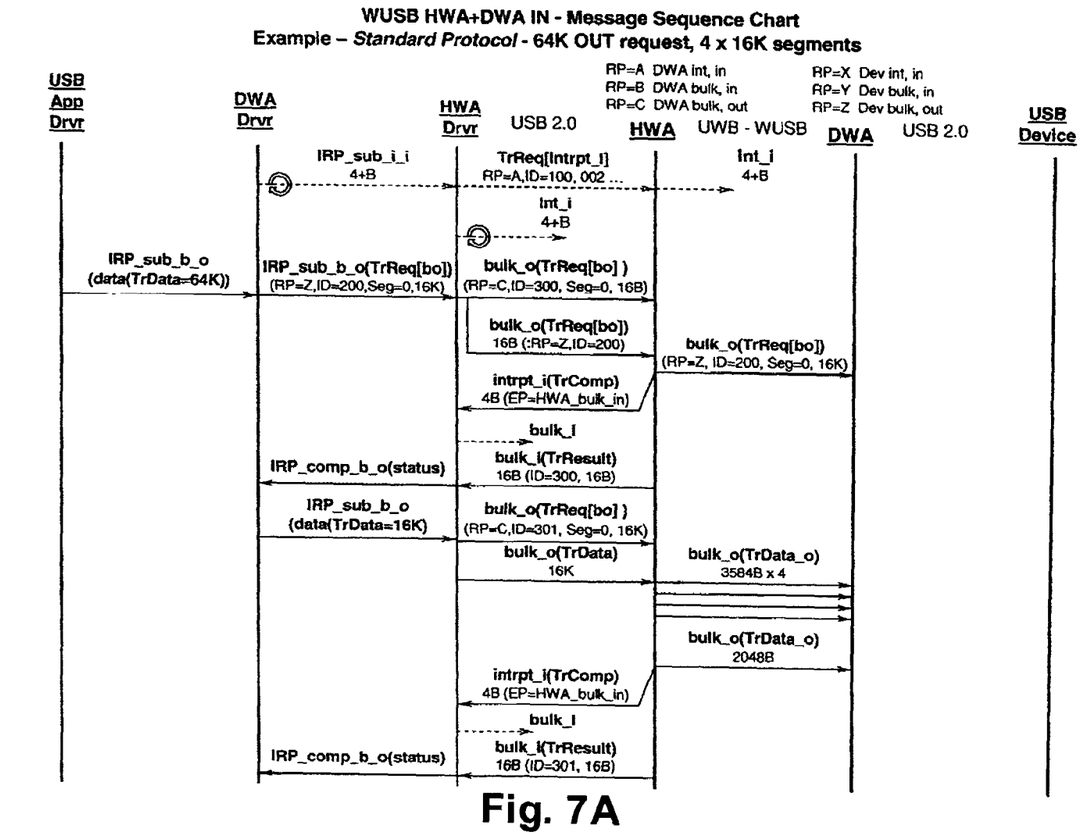
FIGS. 7A and 7B are sequence diagrams illustrating the process flow for an OUT request using the standard wire adapter protocol in accordance with the prior art.
Figure 7B:
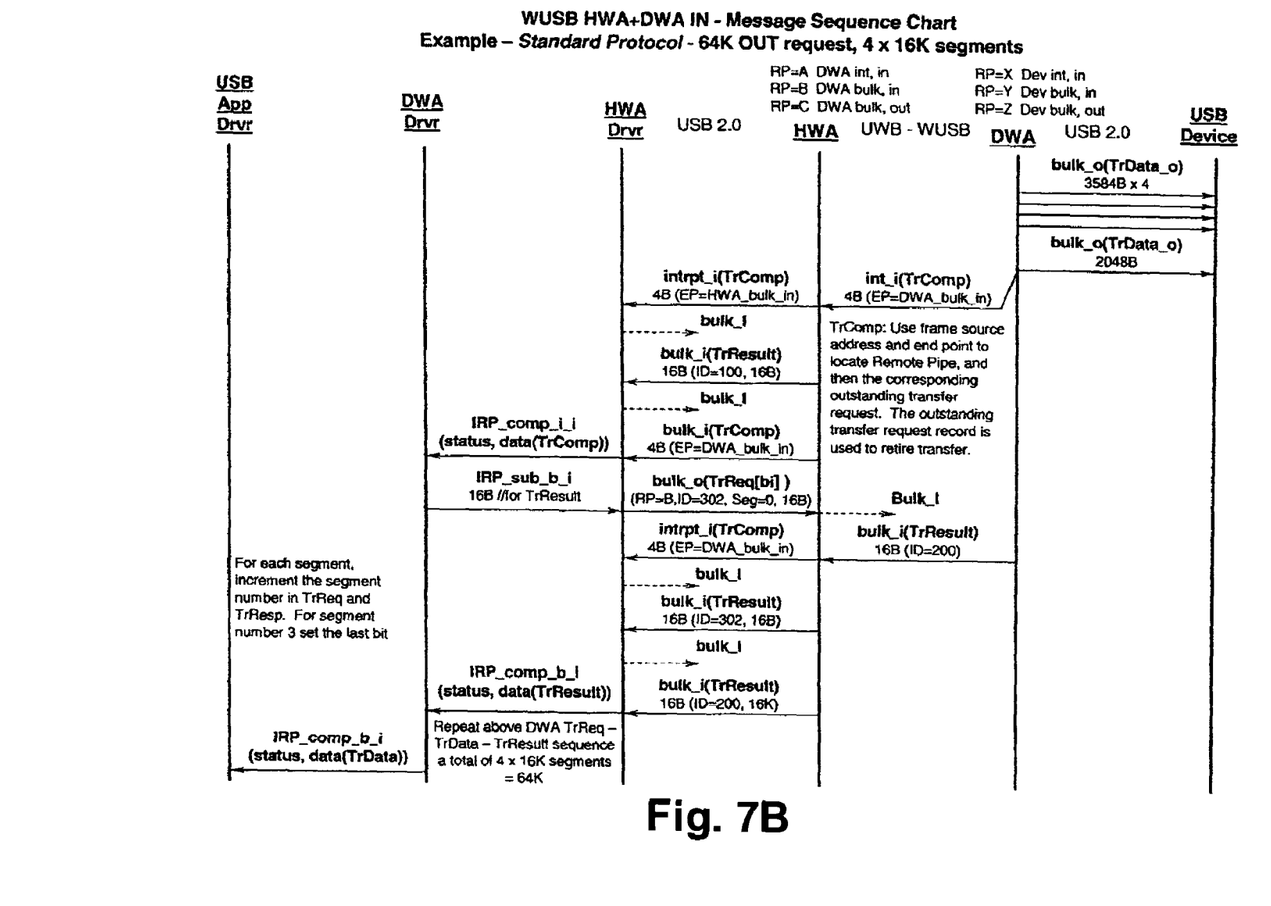

FIGS. 6A and 6B are sequence diagrams illustrating the process flow for an IN request using the standard wire adapter protocol. FIGS. 7A and 7B are sequence diagrams illustrating the process flow for an OUT request using the standard wire adapter protocol. These sequence diagrams graphically illustrate the large number of Transfer Requests necessary under the standard protocol in order to transfer data between the external USB device and its driver. Much of this complexity comes from the fact the transfer requests intended for one layer of the system are seen as data by other layers, thereby invoking acknowledgements for data receipt at each layer of the system before finally delivering the data itself to the destination.

An embodiment of the present invention includes an Enhanced Wire Adapter Protocol that improves throughput by reducing the number of messages that are exchanged as a part of data transfer, thereby reducing processing time and transfer time of the messages over the wired USB interfaces and wireless medium. Throughput is also increased by improving "pipelining" of data flow through the system, which reduces transfer latency.

The enhanced Wire Adapter Protocol eliminates the Transmit Complete message and instead uses polling for Transfer Result to determine when a transfer has completed. IN data transfers may be automatically segmented ("auto-segmentation") into smaller transfers by Wire Adapters. This pushes the intelligence functions onto the Wire Adapters and away from the host software (i.e. the DWA manages the buffer). During the auto-segmentation the size of each segment may vary, whereby the Wire Adapter dynamically and adaptively adjusts the segment size in order to maximize throughput for a given situation. The Wire Adapter automatically manages its available buffers by issuing IN tokens for pending transfers based on buffers being available to accept the IN data.

In an embodiment of the present invention, a Wire Adapter driver segments a transfer request and submits all of these at once. The DWA automatically manages memory to complete each segment. For IN data, the Wire Adapter checks for memory before starting the IN transfers and for OUT data, negative acknowledgements are used to backpressure a segment for which the Wire Adapter does not have enough memory. In an embodiment of the present invention, multiple transfers to or from HWAs over the upstream USB interface may be aggregated into a single USB transfer in order to reduce transfer latency.

For OUT transfer data packets the enhanced Wire Adapter Protocol uses packets that "cut-through" rather than being passed using "store and forward" transfer. Using this new approach, whenever some minimum amount of OUT data is received from the upstream port, the Wire Adapter may transfer the data on the downstream port, rather than wait until a complete segment of data is received. Conversely, the Wire Adapter automatically manages its available data buffers by putting "backpressure" on the upstream port by issuing negative acknowledgments (NAKs) when data buffers are not available to hold incoming data.

The enhanced Wire Adapter Protocol allows forwarding of Transfer Requests by a Wire Adapter, thereby reducing the number of messages used to complete data transfer. Referring back to the example in FIG. 5, under the enhanced protocol the DWA Transfer Request 502 looks like a Transfer Request to the HWA and not data. Thus the HWA realizes that the incoming Transfer Request is really for the DWA and forwards it to the DWA. Forwarding Pipe (FPipe) descriptors are used in conjunction with Remote Pipe (RPipe) descriptors to control forwarding of Transfer Request packets.

Under the enhanced protocol a Wire Adapter automatically polls a downstream Wire Adapter for Transfer Result packets based on a previous Transfer Request to that downstream Wire Adapter. Similarly, the Wire Adapter forwards any received Transfer Result to the upstream interface rather than generating and forwarding a Transmit Complete and new Transfer Result.

Rather than the poll for downstream data initiated by receiving a Transfer Request from the host driver, the Wire Adapter automatically polls a downstream device for IN data based on previously receiving a Transfer Result for an IN data transfer. Similarly, rather than generating and forwarding a Transmit Complete and new Transfer Result, the Wire Adapter simply forwards IN Transfer Data to the upstream interface after reception.

For Transfer Request forwarding the Wire Adapter host driver maintains an association between Transfer IDs in a Transfer Request accepted from another Wire Adapter host driver and the resulting transfer generated by the Wire Adapter. It then uses this association to modify the Transfer ID in Transfer Request and Transfer Result packets.

In one embodiment of the present invention Multiple Wire Adapter drivers (HWA and DWA) may be combined into a single Wire Adapter driver in order to reduce the number of Application Programming Interfaces (APIs) and therefore the latency incurred by passing of messages across the APIs. In addition, combining multiple Wire Adapter drivers allows consolidation in the assignment of Transfer IDs, such that when Transfer Request forwarding is being used the need to maintain the association between Transfer IDs in Transfer Request presented from an upstream driver and the Transfer IDs in issued Transfer Request is eliminated.

Figure 8:
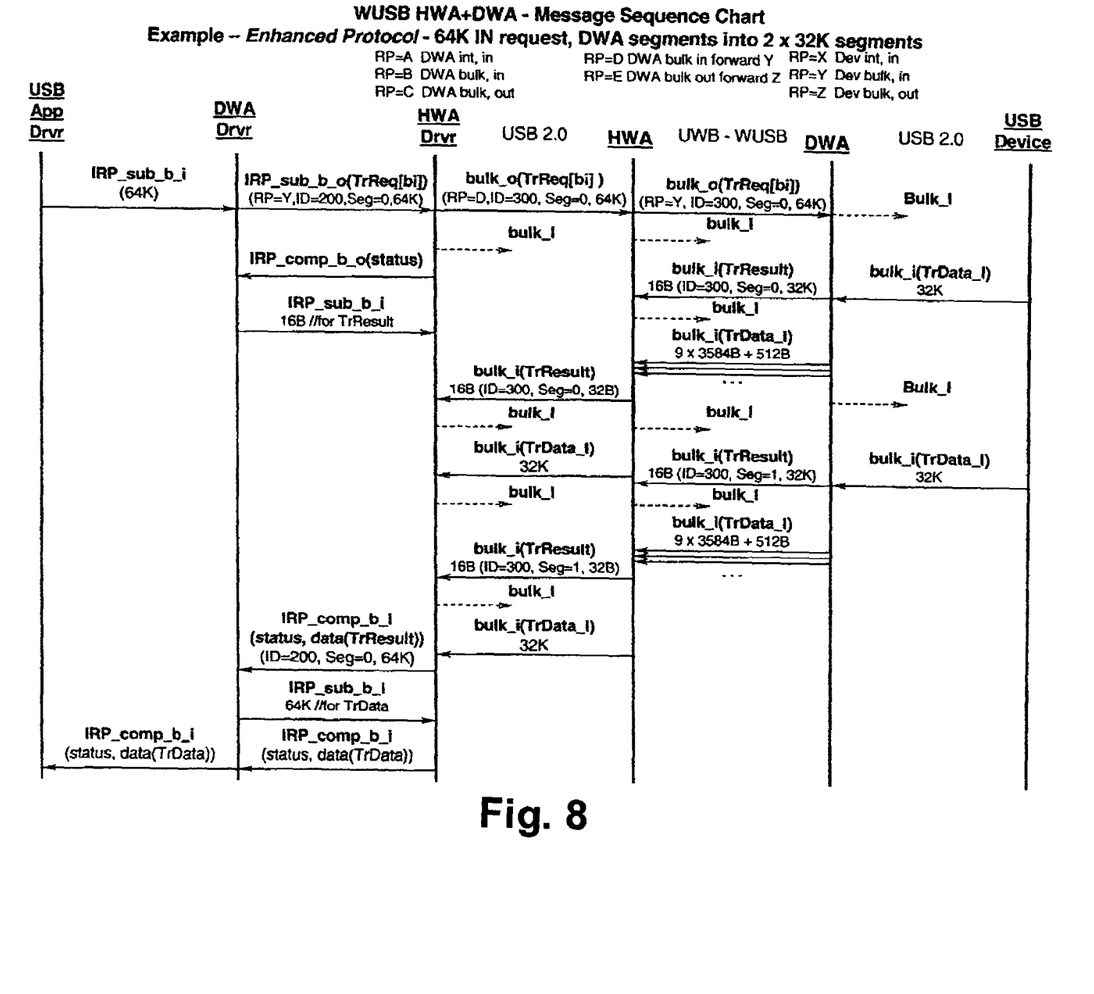
FIG. 8 is a sequence diagram illustrating the process flow for an IN request using the enhanced wire adapter protocol that embodies aspects of the present invention.
Figure 9:
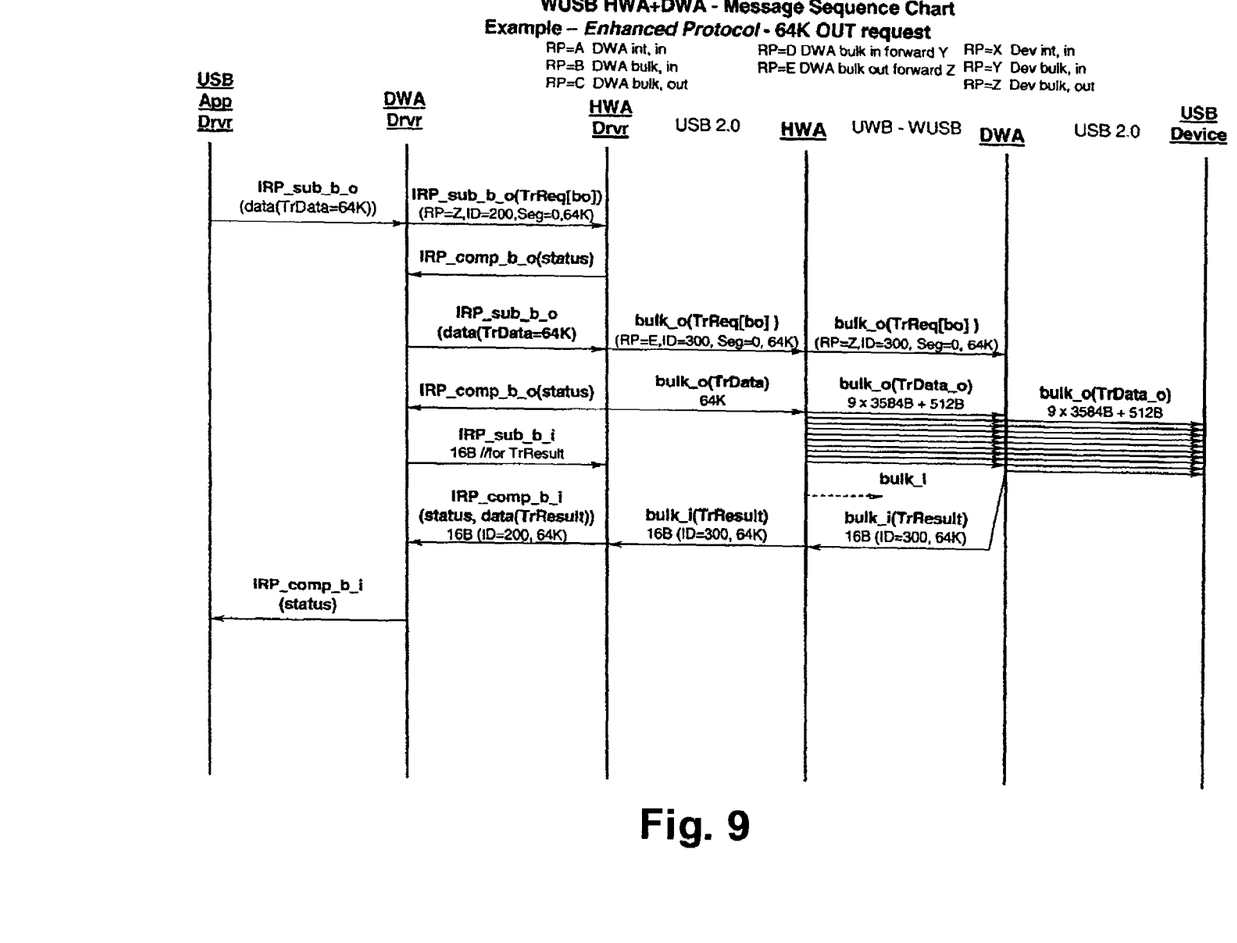
FIG. 9 is a sequence diagram illustrating the process flow for an OUT request using the enhanced wire adapter protocol that embodies aspects of the present invention.

FIG. 8 is a sequence diagram illustrating the process flow for an IN request using the enhanced wire adapter protocol that embodies aspects of the present invention. FIG. 9 is a sequence diagram illustrating the process flow for an OUT request using the enhanced wire adapter protocol that embodies aspects of the present invention. FIGS. 8 and 9 illustrate the reduction in control overhead provided by the enhanced Wire Adapter Protocol in comparison to the sequence diagrams shown in FIGS. 6A, 6B, 7A, and 7B depicting the existing protocol.

Figure 10:
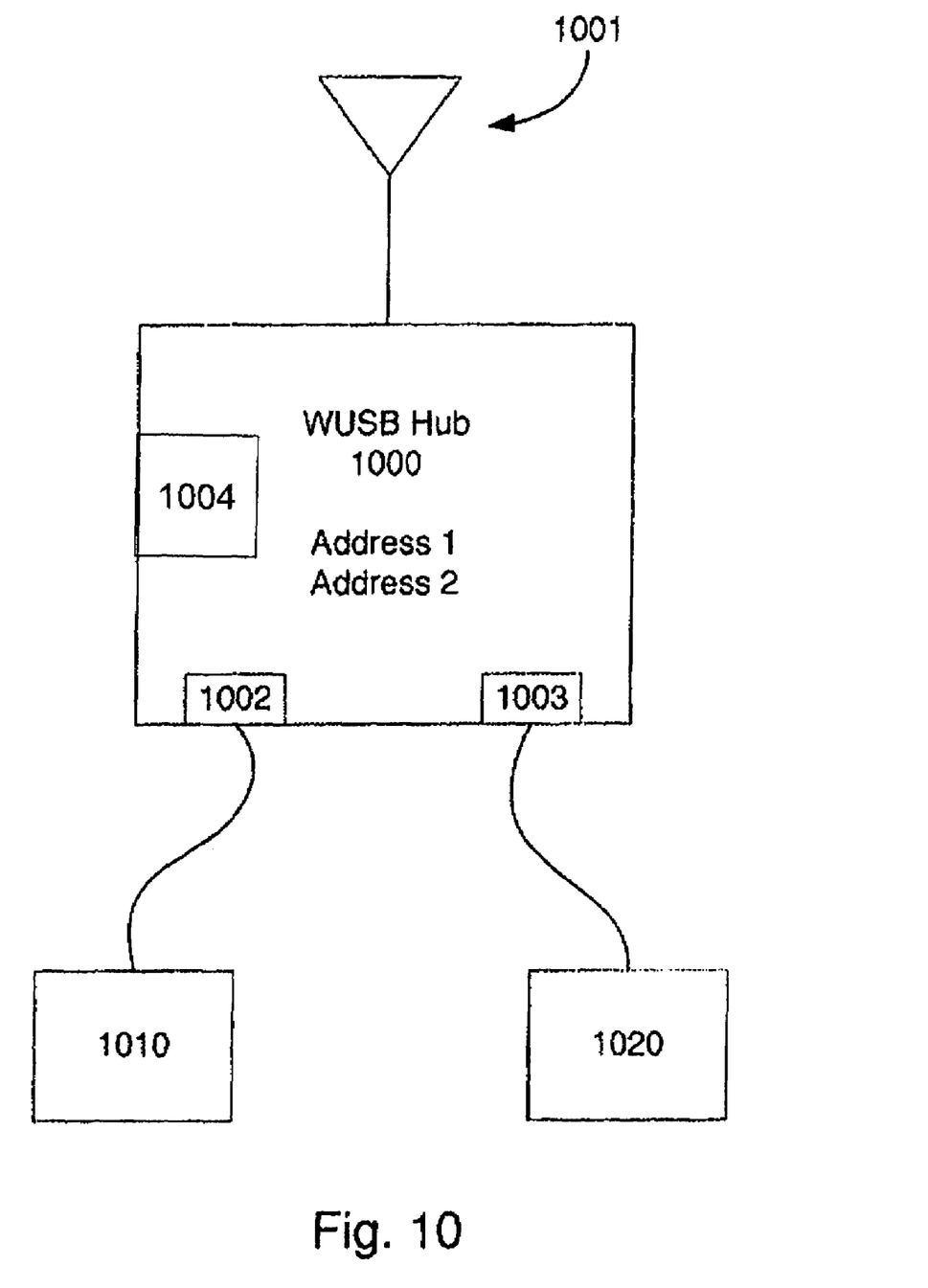
FIG. 10 shows a Wireless USB hub that embodies aspects of the present invention.

FIG. 10 shows a Wireless USB hub that embodies aspects of the present invention. As explained above, the current Wire Adapter protocol is relatively inefficient, whereas the WUSB protocol for "native" WUSB devices is relatively efficient. The Proxy WUSB Hub 1000 takes advantage of this efficiency by presenting wired USB devices 1010, 1020 as if they are "native" WUSB devices.

The Proxy WUSB Hub 1000 is similar to a DWA in that it has a wireless upstream port 1001 and one or more wired USB downstream ports 1002, 1003, wherein wired USB devices 1010, 1020 may be plugged into the downstream wired USB ports. The WUSB Hub differs from a DWA in that the wired USB devices 1010, 1020 appear to the host system as if they are native WUSB devices. This is accomplished by having the WUSB Hub 1000 "proxy" the attached downstream wired devices on the wireless interface. Therefore, the WUSB hub 1000 appears to the host as one or more WUSB devices, not a DWA, which eliminates much of the control packet overhead used by the standard Wire Adapter Protocol.

An attached wired USB device either 1) is presented as a unique WUSB device with its own device address, or 2) is presented as a separate function on an already existing device (the WUSB hub for instance, which may enumerate as a DWA). With this latter approach the wired device endpoints are mapped into WUSB hub endpoints.

The WUSB Hub uses various mechanisms in order to properly proxy a USB device to the host as if it is a WUSB device. The following description applies to the case when the WUSB hub presents downstream USB devices as WUSB devices, rather than as functions on the DWA.

Each WUSB device maintains a security connection context. The connection context is negotiated during first-time connection. The WUSB Hub negotiates the security connection context for the USB devices without the knowledge or involvement of the downstream devices and stores the security connection context. A sufficient number of unique security connection contexts are negotiated and maintained in order to support the maximum number of downstream USB devices that the WUSB hub is capable of simultaneously proxying. A specific connection context is not tied to a particular downstream USB device, rather the connection contexts are applied as needed when USB devices are attached.

The WUSB hub maintains a unique WUSB device address for each attached proxy USB device, and it participates in the WUSB protocol as if it were the WUSB devices it is proxying, rather than appearing as an intervening device (like a DWA).

The WUSB Hub detects USB attachment either directly or by intercepting interrupt packets from attached downstream hubs. Upon detecting attachment of downstream devices the WUSB hub does not forward interrupt packets to the host or directly inform the host of USB attachment. Instead, the WUSB hub performs a WUSB device connection procedure on behalf of the USB device.

The WUSB hub reads the descriptors of the USB devices and modifies them so that they are consistent with descriptors for WUSB devices. For example, the maximum packet size field in the Standard Endpoint Descriptor is modified so that it is consistent with WUSB packet sizes. The bmAttributes field in the Standard Configuration Descriptor is set to indicate that the device is self-powered.

For some USB devices which do not use zero-packet-length semantics to indicate the end of transfers, the lengths of IN transfers are used so that the correct number of bytes are read. However, in the case of a WUSB hub, the length of IN transfers is not available with the WUSB protocol. Without transfer requests, there is no previously declared limit on the amount of data to read. Fortunately, the upstream wireless device is provided with the expected length of transfers.

The WUSB protocol is modified slightly in order to support the WUSB hub. Two options are available. In the first option, the maximum packet size field in IN Channel Time Allocation (CTE), Information Elements (IEs) sent in WUSB host Micro-scheduled Management Control (MMC) can be used to indicate the expected transfer length. Alternatively, a field may be added to CTAs to indicate the expected transfer length.

In an embodiment of the present invention, the WUSB hub includes a controller 1004 to perform the functions and operations of the WUSB hub, discussed above.

For the case in which a WUSB hub proxies one or more downstream USB devices as functions on the WUSB hub/DWA, the above description generally applies, except that the security connection context and WUSB device address is shared with the WUSB hub. In addition, when a USB device attaches, the WUSB hub maps WUSB hub wireless endpoints one-for-one for USB device endpoints and treats the collection of endpoints associated with a particular USB device as a function on the WUSB hub. The WUSB hub informs the host that a new function needs to be enumerated in order to activate support for a newly attached device.

Although embodiments of the present disclosure have been described in detail, those skilled in the art should understand that they may make various changes, substitutions and alterations herein without departing from the spirit and scope of the present disclosure.

What is claimed is:

1. A method for communicating between a wired USB enabled device and a first wireless USB enabled device in a wireless USB system, comprising:
    detecting said wired USB enabled device;
    presenting said wired USB enabled device as a second wireless USB enabled device to said first wireless USB enabled device;
    determining an expected amount of data to be transferred from said wired USB enabled device to said first wireless USB enabled device;
    modifying a predetermined wireless USB protocol to include said expected amount of data; and
    providing said expected amount of data to said first wireless USB enabled device.

2. The method of claim 1, further comprising:
    reading a device descriptor from said wired USB enabled device; and
    modifying said device descriptor so that it is consistent with a device descriptor for any wireless USB enabled device as specified by a predetermined wireless USB standard.

3. The method of claim 2, wherein,
    said device descriptor includes a standard endpoint descriptor, and
    said modifying said device descriptor includes setting a maximum packet size field in said standard endpoint descriptor to be consistent with wireless USB packet sizes.

4. The method of claim 2, wherein,
    said predetermined wireless USB protocol includes a predetermined wireless USB wire adapter protocol, and
    said modifying said predetermined wireless USB protocol includes adding a field in a channel time allocation portion of said predetermined wireless USB wire adapter protocol, said field specifying said expected amount of data.

5. The method of claim 2, wherein,
    said predetermined wireless USB protocol includes a predetermined wireless USB wire adapter protocol, and
    said modifying said predetermined wireless USB protocol includes setting a maximum packet size field in a channel time allocation portion of said predetermined wireless USB wire adapter protocol, said field specifying said expected amount of data.

6. The method of claim 2, further comprising:
    intercepting a read descriptor request from said first wireless USB enabled device; and
    providing said first wireless USB enabled device with a response to said read descriptor request after said modifying said device descriptor.

7. The method of claim 1, further comprising:
    negotiating and maintaining a wireless USB security connection context for communication with said wireless USB enabled device; and
    applying said wireless USB security connection context after detecting said wired USB enabled device.

8. The method of claim 1, further comprising maintaining a unique wireless USB device address for said wired USB enabled device, and wherein presenting said wired USB enabled device includes presenting said wired USB enabled device having said unique wireless USB device address.

9. The method of claim 1, further comprising:
    mapping a first endpoint associated with said wired USB enabled device to a second endpoint associated with said first wireless USB enabled device; and
    informing said first wireless USB enabled device that a new function needs to be enumerated, wherein said new function is associated with said first wireless USB enabled device.

10. A wireless USB enabled hub that facilitates communication between a wired USB enabled device and a first wireless USB enabled device, comprising:
    a first port configured to communicate with said wired USB enabled device;
    a second port configured to communicate with said first wireless USB enabled device; and
    a controller configured to:
        detect said wired USB enabled device;
        present said wired USB enabled device as a native wireless USB enabled device to said first wireless USB enabled device;
        determine an expected amount of data to be transferred from said wired USB enabled device to said first wireless USB enabled device; and
        modify a predetermined wireless USB protocol to include said expected amount of data.

11. The wireless USB enabled hub of claim 10, wherein,
    said controller is configured to present said hub as a device wire adapter to said first wireless USB enabled device, and said first wireless USB enabled device includes a wireless USB enabled host.

12. The wireless USB enabled hub of claim 10, wherein the controller is configured to present said wired USB enabled device to said first wireless USB enabled device as a unique wireless USB enabled device having its own address.

13. The wireless USB enabled hub of claim 10, wherein the controller is configured to present said wired USB enabled device as a separate function on the wireless USB enabled hub by mapping a wired USB enabled device endpoint to a wireless USB enabled hub endpoint.

14. The wireless USB enabled hub of claim 10, wherein said controller is configured to:
   maintain a wireless USB address for each of a plurality of downstream wired USB enabled devices; and
   respond to a wireless USB packet directed to one of said plurality of downstream USB enabled devices.

15. The wireless USB enabled hub of claim 10, wherein said controller is configured to:
   intercept a device descriptor request from said first wireless USB enabled device;
   read a device descriptor from said wired USB enabled device;
   modify said device descriptor so that it is consistent with a device descriptor for any wireless USB enabled device as specified by a predetermined wireless USB standard; and
   present said wired USB enabled device as said native wireless USB enabled device by providing said modified device descriptor to said first wireless USB enabled device.

16. The wireless USB enabled hub of claim 15, wherein,
   said device descriptor includes a standard endpoint descriptor, and
   said controller is configured to modify said device descriptor by setting a maximum packet size field in said standard endpoint descriptor to be consistent with wireless USB packet sizes.

17. The wireless USB enabled hub of claim 10, wherein,
   said predetermined wireless USB protocol includes a predetermined wireless USB wire adapter protocol, and
   said controller is configured to modify said predetermined wireless USB wire adapter protocol by setting a maximum packet size field in a channel time allocation portion, said maximum packet size field specifying said expected amount of data.

18. The wireless USB enabled hub of claim 10, wherein,
   said predetermined wireless USB protocol includes a predetermined wireless USB wire adapter protocol, and
   said controller is configured to modify said predetermined wireless USB wire adapter protocol by adding a field in a channel time allocation portion of said predetermined wireless USB protocol, said field specifying said expected amount of data.

19. The wireless USB enabled hub of claim 10, wherein said controller is configured to:
   negotiate and maintain a wireless USB security connection context for communication with said wireless USB enabled device; and
   apply said wireless USB security connection context after said controller detects said wired USB enabled device.

20. An apparatus that facilitates communication between a wired USB enabled device and a first wireless USB enabled device, comprising:
   means for communicating with said wired USB enabled device;
   means for communicating with said first wireless USB enabled device; and
   means for detecting said wired USB enabled device;
   means for presenting said wired USB enabled device as a native wireless USB enabled device to said first wireless USB enabled device;
   means for determining an expected amount of data to be transferred from said wired USB enabled device to said first wireless USB enabled device; and
   means for modifying a predetermined wireless USB protocol to include said expected amount of data.

21. A computer-readable medium encoded with computer executable instructions that when executed by a processor cause the processor to perform a method for communicating, the method comprising:
   detecting a wired USB enabled device;
   presenting said wired USB enabled device as a second wireless USB enabled device to a first wireless USB enabled device;
   determining an expected amount of data to be transferred from said wired USB enabled device to said first wireless USB enabled device;
   modifying a predetermined wireless USB protocol to include said expected amount of data; and
   providing said expected amount of data to said first wireless USB enabled device.

* * * * *

UNITED STATES PATENT AND TRADEMARK OFFICE
CERTIFICATE OF CORRECTION

PATENT NO.         : 7,761,627 B2                                              Page 1 of 1
APPLICATION NO.    : 11/963499
DATED              : July 20, 2010
INVENTOR(S)        : Christison et al.

It is certified that error appears in the above-identified patent and that said Letters Patent is hereby corrected as shown below:

Column 1, lines 7 and 8, related U.S. application data: "Dec. 21, 2006," to read as --Dec. 22, 2006,--

Signed and Sealed this
Fourteenth Day of June, 2011

David J. Kappos
*Director of the United States Patent and Trademark Office*